Figure 2:
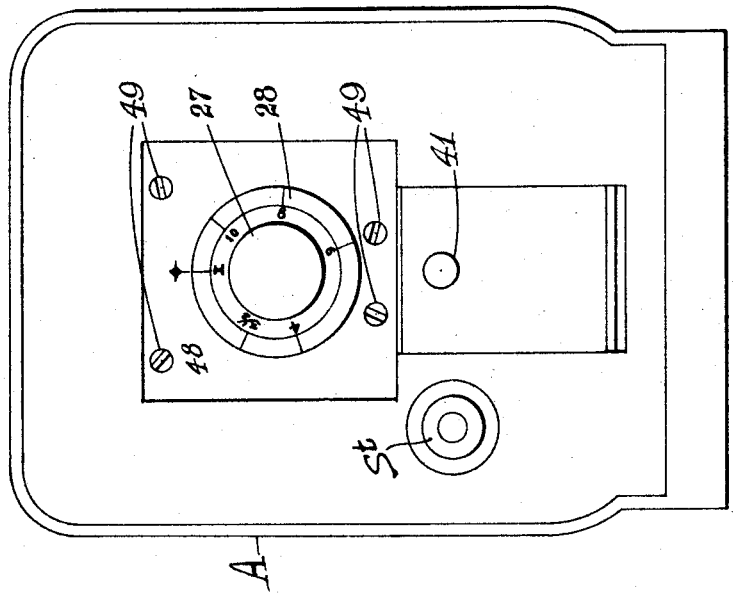

B. A. BRIGDEN.
MULTICOLOR CAMERA.
APPLICATION FILED MAY 1, 1915.

1,187,884.

Patented June 20, 1916.
4 SHEETS—SHEET 1.

INVENTOR
Burt A. Brigden
BY
John A. Bommhardt
ATTORNEY

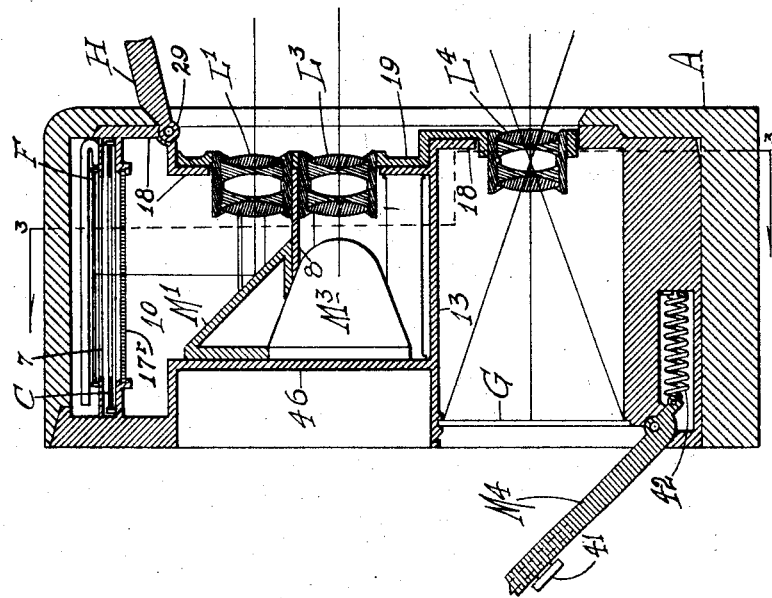

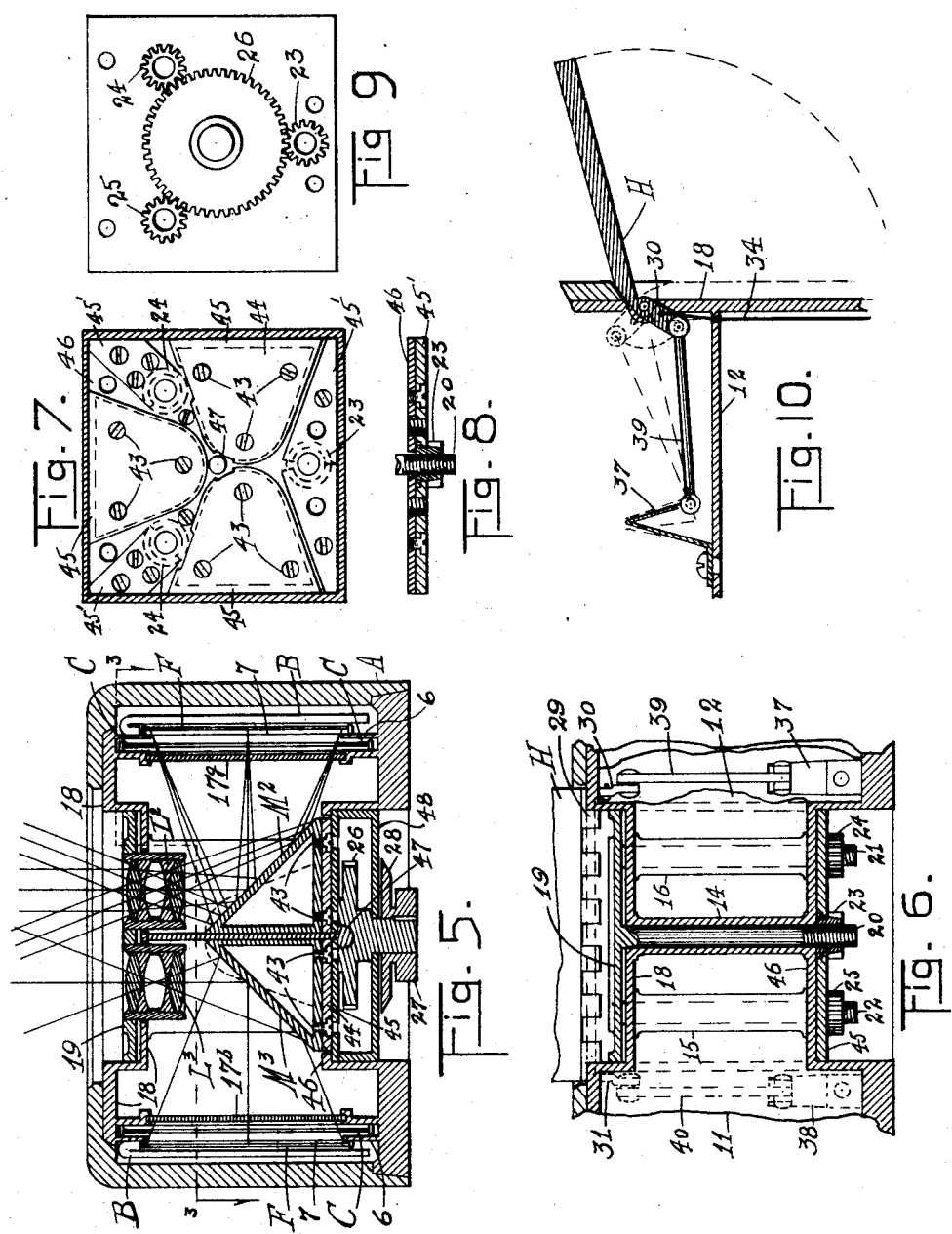
B. A. BRIGDEN.
MULTICOLOR CAMERA.
APPLICATION FILED MAY 1, 1915.
1,187,884.
Patented June 20, 1916.
4 SHEETS—SHEET 3.
INVENTOR
Burt A. Brigden
BY
John A. Bommhardt
ATTORNEY B.-A. BRIGDEN.
MULTICOLOR CAMERA.
APPLICATION FILED MAY 1, 1915.
1,187,884.
Patented June 20, 1916.
4 SHEETS—SHEET 4.
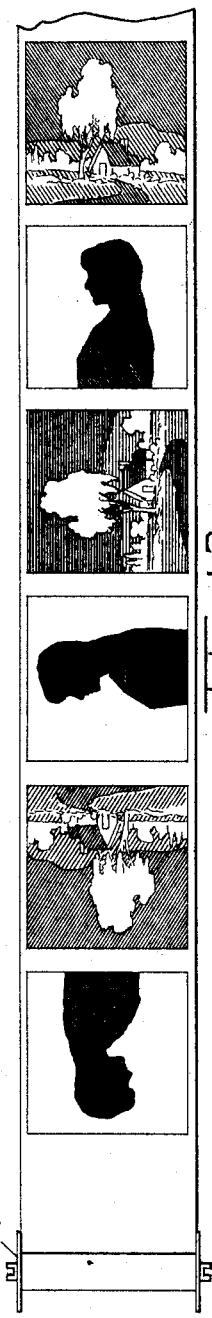
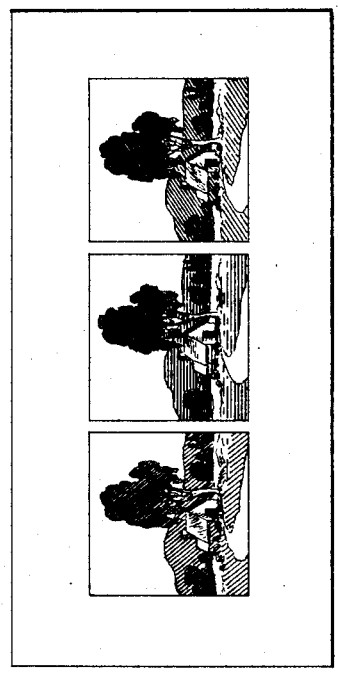
INVENTOR
Bert A. Brigden
BY
John A. Bommhardt
ATTORNEY

UNITED STATES PATENT OFFICE.

BURT A. BRIGDEN, OF CLEVELAND, OHIO.

MULTICOLOR-CAMERA.

1,187,884.　　　　Specification of Letters Patent.　　Patented June 20, 1916.

Application filed May 1, 1915. Serial No. 25,172.

*To all whom it may concern:*

Be it known that I, BURT A. BRIGDEN, citizen of the United States, residing at Cleveland, in the county of Cuyahoga and State of Ohio, have invented certain new and useful Improvements in Multicolor-Cameras, of which the following is a specification.

This invention relates to multi-color cameras, and has for its object to provide a simple and improved construction especially adapted for making three color records simultaneously, and practically the same in detail and angle of view, reducing parallax to a minimum and differing only in color values.

The camera is adapted for rapid exposure work for all photo-color processes, and for making records for stereopticon projection in color.

The arrangement includes a grouping of a plurality of camera units in a single casing, three units being shown, each of which is provided with a mirror to reflect the image laterally and outwardly. A sensitive surface or surfaces are provided to receive the images. In the embodiment shown, this surface consists of a film which is arranged to travel around the group, between the same and the casing of the instrument, and the exposure is controlled by a shutter of the curtain or focal-plane type, which also extends around the group, between the same and the film, and is provided with openings through which the exposures of all the units are simultaneously made on different parts of the film. These parts are spaced apart a sufficient distance so that the intervening portions of the film may be exposed at another operation. The images are reversed in the camera. Means are provided to prevent mal-exposure when setting the shutter, a lid or cover being hinged to the camera front, and the shutter rolls are connected with it in such manner that the shutter can be reset only when the cover is closed, and yet be free to operate for exposure while it is open.

Means are also provided for simultaneously focusing the objectives of the three units, the units and focusing devices being assembled in a compact form and operated by a single device at the back.

I have shown three units, with a finder, but the invention is not limited to any particular number, and may be varied as desired, as by the addition of a fourth unit for a neutral record or for four color work.

Figure 1:
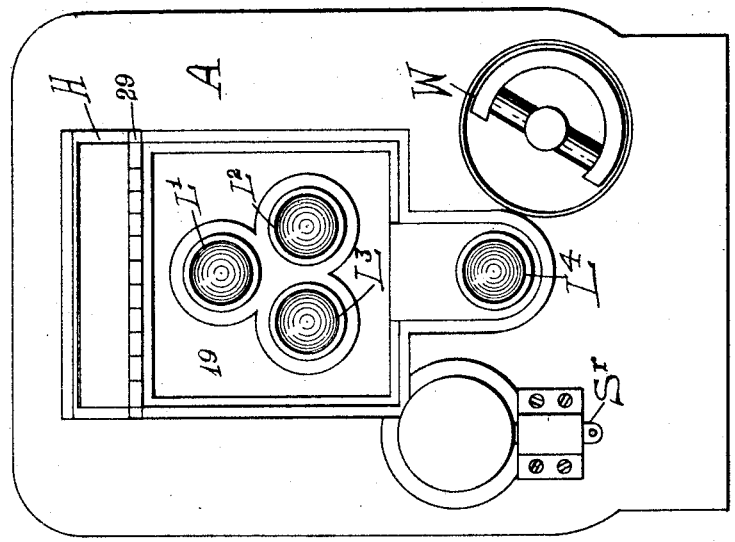

In the accompanying drawings, Figure 1— is a front view of the camera, the lid being open. Fig. 2— is an elevation of the back of the camera. Fig. 3— is a section on the lines 3—3 of Figs. 4 and 5. Fig. 4— is a section on the line 4—4 of Fig. 3. Fig. 5— is a section on the line 5—5 of Fig. 3 showing the reversal of the image by the mirrors. Fig. 6— is a partial section on the line X—X of Fig. 3 showing the focusing device. Fig. 7— is a detail in elevation of the back plate showing the adjusting screws for the mirrors. Fig. 8— is a section of Fig. 7. Fig. 9— is a plan of the focusing gears. Fig. 10— is a detail of the hood and spring. Figs. 11 and 12— are plans showing a film with one and two exposures, respectively. Fig. 13— is a plan showing a lantern slide with assembled positives from records shown in Fig. 11.

Referring specifically to the drawings, $L^1$, $L^2$, $L^3$ are the objective lenses, and $L^4$, a lens of the same focal length, for use both as a view finder and as a focusing lens, the image being formed on the ground glass G and seen by reflection from a magnifying mirror $M^4$.

A is an outer casing of the apparatus and the upper part thereof contains the three camera units, which include the lenses referred to and the flat mirrors $M'$, $M^2$, $M^3$, located behind corresponding lenses, and each set at an angle of 45° to the axis of the respective lens, the mirror $M'$ being at an angle of 90° to the mirrors $M^2$, $M^3$. In other words, the axial ray from the objective $L^1$ is reflected from the mirror $M'$ at an angle of 90° from the axial rays reflected from the mirrors $M^2$ $M^3$, the rays from all after reflection being directed outwardly to a sensitive film.

The film F extends around the units so grouped, R indicating the winding spool for the film and R′ the supply spool. The curtain or focal plane shutter C extends around within the film, between a tension roll S and a setting roll S′, these rolls and the film rolls being conveniently located in compartments in the lower part of the casing. The curtain is provided with openings $c'$, $c^2$, $c^3$, corresponding in position to the camera units. A shield 6 separates the film from the curtain passages and the interior of the camera, and this shield has framing openings 7, alike in size and placed to permit the same angle of view to reach the film from each objective.

The openings $c'$, $c^2$, $c^3$ may be varied in size, if desired, to correspond with the varying exposure requirements for the different colors.

B are backing pads cemented to the shield 6 and loosely in contact with the back of the film, and designed to prevent halation or fogging of the film outside of the area of the opening 7, as when large reels of film without paper backing are used. Ordinarily these pads may be omitted, as the camera is designed particularly for small "day light loading" spools of film which are backed.

The casing is provided with angularly arranged partitions 8, 9, 10, 11, 12 and 13, which, in connection with the front and back plates, form three separate light tight units or camera compartments. The partitions 8, which are triangularly arranged, are provided with tubes 14, 15 and 16, extending from front to back, and forming guides for the focusing rods, these tubes being conveniently located between the three units. The units are provided with blue, red and green ray filters or screens indicated at $17^b$, $17^r$, $17^g$. These filters may be located any place between the subject and the film, but when placed as shown, between the mirrors and the curtain, serve to protect the mirrors from dust.

The front plate of the camera casing is indicated at 18, and 19 is the lens plate which carries all the lenses, which are arranged in a triangle and close together to avoid objectionable parallax. The focusing rods 20, 21 and 22 project rearwardly from the lens plate, through the guide tubes 14, 15 and 16, and the rear ends of the rods are screw-threaded to receive forward and backward thrust from gear nuts 23, 24 and 25 which mesh with a large or master gear 26 rigidly connected with a milled knob or wheel 27 and a focusing scale dial 28 which coöperates with an index on the bearing plate 48, which is secured to the back plate 46 by screws 49. The gear 26 has a socket to receive the projection 47 on the back plate 46 to give a firm bearing for the dial shaft.

The hood or front lid H is hinged as at 29 to the front plate and has short levers 30 and 31 (Figs. 6 and 10) at the ends of the hinge, projecting rearwardly into the light-tight wells or compartments 32 and 33 (Fig. 3). The lever 30 is connected by a small wire 34 (Figs. 10 and 3) with a spring pawl 35 which engages a ratchet 36 on the tension roll S to prevent setting of the shutter while the hood is open and to release the pawl and permit setting of the shutter when the hood is closed. The hood is retained in open or closed position by springs 37 and 38 acting through the connecting rods 39 and 40 on levers 30 and 31, to hold the same to either side of center.

The magnifying mirror $M^4$, carried by hinged lid at the back of the casing, is retained in closed position by a latch 41, and in open position by a coiled tension spring 42 and located in a recess in the bottom of the casing.

The adjusting screws 43 for the mirrors $M'$, $M^2$, $M^3$ have their heads blocked from thrust by plates 45 which are riveted or otherwise fastened to plates 44 behind the mirrors, and the mirror supports, together with the plates 44 and 45, are removable from the back plate 46 to permit cleaning of the mirrors. $45'$ are retaining plates for the gear nuts.

The film passes over guide rollers 50, 51, 52 and 53 arranged at the corners, and the curtain passes over guide rolls 54 to 59 in the curtain passage.

In Fig. 2, $St$ is a tension spring winding knob, and in Fig. 3, 60 is a spring tension shaft in the roller S, actuated by the knob. $Sr$ is a shutter release, the details of the shutter mechanism not being shown. W is a film winding key.

The distance in the line of film travel between the exposure openings 7 is slightly greater than the width of said openings, so that at the first exposure film sections are left blank, as shown in Fig. 11, and by winding the film to proper position these spaces may be filled by another exposure, as shown in Fig. 12.

In operation, parallax is as stated reduced to the minimum by the close grouping and triangular arrangement of the objectives, and at each exposure an image will be reflected by the mirrors and through the corresponding screens and slits in the shutter to the film which will thus receive impressions corresponding to the different color values, these records can be easily reproduced properly assembled in the form of lantern slides (Fig. 13) or for other photocolor processes. The apertures in the curtain are properly spaced apart to expose all the views simultaneously, the opaque parts covering the openings 7 when the shutter is closed.

What I claim as new is:

1. In a camera, in combination, a plurality of lenses, a plurality of mirrors arranged to reflect the rays laterally with respect to the axes of said lenses respectively and onto a sensitized surface, and shutter means between said mirrors and surfaces for simultaneously controlling the passage of rays between said mirrors and surfaces.

2. The combination with a plurality of objectives each adapted to project an image onto a sensitive surface, of a single flexible curtain shutter having a plurality of openings simultaneously registering with said objectives respectively, and controlling the passage of light from said objectives to said surface.

3. The combination with a plurality of objectives, and a color screen for each, adapted to each project an image on a sensitive surface, of a single flexible curtain shutter having a plurality of openings corresponding to said surfaces and simultaneously registering therewith and adapted to simultaneously permit the passage of light from said objectives to said surfaces respectively.

4. In a camera, the combination with multiple objectives, of means to simultaneously transmit a plurality of images of the same subject from said objectives to different positions on a film according to the different color values, said means including a single flexible curtain shutter having a plurality of openings corresponding to said objectives and positions respectively.

5. The combination with a plurality of objectives, of means to simultaneously transmit a plurality of images of the same subject from said objectives to a plurality of surfaces respectively according to different color values, said means including a single flexible curtain shutter having a plurality of openings corresponding to said objectives and surfaces respectively.

6. The combination of a plurality of centrally located camera units, including mirrors to divert rays laterally, and color screens to vary the color values of each, of a shutter behind said units having a plurality of openings corresponding to the said units, and adapted to permit the simultaneous passage of light from each unit to different parts of a sensitive surface respectively.

7. The combination of a plurality of cameras having their objectives closely grouped, and each having a mirror arranged to reflect light outwardly at an angle to the axis of the corresponding objective, a color screen in each camera, and a single shutter adapted to permit the simultaneous passage of light from said cameras respectively to different parts of a film.

8. The combination of a plurality of cameras having their objectives closely grouped, and each having a mirror arranged to reflect light outwardly at an angle to the axis of the corresponding objective, a color screen in each camera, a casing having a film passage extending around said cameras, and a single shutter extending around between said cameras and the film passage and having a plurality of openings corresponding to the cameras respectively, to permit the passage of light therefrom to different parts of the film.

9. The combination of a plurality of camera units with objectives arranged closely adjacent each other, each unit having a reflector arranged to direct light laterally from the axis of its objective to openings spaced apart, a casing having a sensitive film passage extending across said openings, and shutter devices controlling said openings, the distance in the line of the film between the openings being at least as great as the distance across said openings, whereby, after exposure, spaces will remain on the film between the exposed parts, of sufficient length to receive another exposure through said openings.

10. A multicolor camera comprising, in combination, a casing having a film passage therein, a plurality of camera units in said casing, each unit including a reflector arranged to direct rays outwardly therefrom, said film passage extending around said units in position for the film to receive an image from each of said units, on different parts of the film respectively, and a flexible shutter extending between the units and the film passage and having a plurality of openings corresponding to said units and controlling the passage of light therefrom to said film.

11. A camera comprising, in combination, a casing, plurality of camera units grouped centrally in said casing, each unit including a reflector arranged to reflect an image laterally toward the wall of the casing and to a sensitive film extending around said group, and a curtain shutter extending around said group and provided with a plurality of openings corresponding to said units respectively, and controlling the passage of light therefrom to said film.

12. In a camera, in combination, a plurality of lenses, a plurality of mirrors arranged to reflect the rays laterally with respect to the axes of said lenses respectively and onto a sensitized surface, and curtain shutter means for simultaneously controlling the passage of rays to said surface.

13. In a camera, in combination, a casing, partitions therein forming a plurality of separate compartments with lateral openings, said casing having a film passage extending across said openings, a continuous shutter extending between the film passage and said compartments and having slits corresponding with said openings, a lens at the front of each compartment, and a mirror behind each lens, arranged to reflect the light therefrom through said opening when the shutter is operated.

14. In a camera, the combination of a plurality of camera units having spaces for sensitive surfaces arranged in different planes, and a single shutter having a plurality of openings corresponding in number and position to said units and controlling the passage of rays from said units to the said surfaces respectively.

15. In a camera, the combination of a plurality of camera units having spaces for sensitive surfaces arranged at angles to one another, a single flexible shutter extending around said units and having a plurality of openings corresponding in number and position to said units and spaces and controlling the passage of rays from said units to said surfaces respectively, and means to transmit the rays of each unit to said surfaces respectively.

In testimony whereof, I affix my signature in presence of two witnesses.

BURT A. BRIGDEN.

Witnesses:
JOHN A. BOMMHARDT,
A. A. BEMIS.

Copies of this patent may be obtained for five cents each, by addressing the "Commissioner of Patents, Washington, D. C."